United States Patent
Maeng (10) Patent No.: US 9,342,598 B1
(45) Date of Patent: May 17, 2016

(54) METHODS, DEVICES, AND MEDIUMS ASSOCIATED WITH COLLABORATIVE RESEARCH

(75) Inventor: Joon Maeng, Newcastle, WA (US)

(73) Assignee: Intellectual Ventures Fund 79 LLC, Las Vegas, NV (US)

(*) Notice: Subject to any disclaimer, the term of this patent is extended or adjusted under 35 U.S.C. 154(b) by 485 days.

(21) Appl. No.: 13/165,254

(22) Filed: Jun. 21, 2011

(51) Int. Cl.
*G06F 17/30* (2006.01)

(52) U.S. Cl.
CPC .... *G06F 17/30864* (2013.01); *G06F 17/30672* (2013.01)

(58) Field of Classification Search
CPC ............. G06F 17/30864; G06F 17/30991; G06F 17/30964; G06F 17/30699; G06F 17/30867
USPC ......... 707/705, 722, 713, 769, 706, 822, 780, 707/736
See application file for complete search history.

(56) References Cited

U.S. PATENT DOCUMENTS

| | | | | |
|---|---|---|---|---|
| 7,440,976 | B2* | 10/2008 | Hart | G06F 17/30693 |
| 7,644,101 | B2* | 1/2010 | Yano | 707/793 |
| 7,730,054 | B1* | 6/2010 | Marmaros et al. | 707/713 |
| 7,792,789 | B2* | 9/2010 | Prahlad | G06F 17/30616 707/608 |
| 7,822,733 | B2* | 10/2010 | Son | 707/706 |
| 8,417,697 | B2* | 4/2013 | Ghemawat et al. | 707/732 |
| 8,452,800 | B2* | 5/2013 | Pickens | G06F 17/30867 707/608 |
| 8,631,029 | B1* | 1/2014 | Amacker | G06F 17/30572 707/766 |
| 2002/0165856 | A1* | 11/2002 | Gilfillan | G06F 17/30864 |
| 2007/0022111 | A1* | 1/2007 | Salam | G06F 17/30864 |
| 2007/0022125 | A1* | 1/2007 | Salam et al. | 707/100 |
| 2007/0022215 | A1* | 1/2007 | Singer | G06F 17/3028 709/246 |
| 2007/0226183 | A1* | 9/2007 | Hart | G06F 17/30699 |
| 2008/0222108 | A1* | 9/2008 | Prahlad | G06F 17/30616 |
| 2009/0024581 | A1* | 1/2009 | Pickens | G06F 17/30867 |
| 2009/0063990 | A1* | 3/2009 | Morris | G06F 17/30864 715/751 |
| 2009/0100052 | A1* | 4/2009 | Stern | G06F 17/30867 |
| 2009/0216757 | A1* | 8/2009 | Sen | G06F 17/30867 |
| 2010/0306231 | A1* | 12/2010 | Fisher | G06F 17/30867 707/769 |

* cited by examiner

*Primary Examiner* — Jean M Corrielus
(74) *Attorney, Agent, or Firm* — Schwabe, Williamson & Wyatt (57) ABSTRACT

An apparatus may include a memory device configured to store instructions, and a processing device that, in response to executing the instructions stored in the memory device, may be configured to perform operations. The operations may include identifying a first set of search results associated with a first user and identifying a second set of search results associated with a second user. The first set of search results may be compared with the second set of search results, and the second set of search results may be modified based, at least in part, on the comparison. The processing device may be configured to generate a modified version of the second set of search results that is displayed to the second user.

39 Claims, 6 Drawing Sheets

METHODS, DEVICES, AND MEDIUMS ASSOCIATED WITH COLLABORATIVE RESEARCH

BACKGROUND

Known research tools may provide a particular user with the ability to conduct research on a topic of interest, and may return search results to the particular user. The particular user using the known research tools may enter search terms as part of the research. Other users of the known research tools may also conduct research on the topic of interest and may obtain substantially similar search results as the particular user.

The other users of the known research tools may use different search terms to research the topic of interest, and may obtain different search results in addition to the similar search results. Nevertheless, the known research tools cause the other users to duplicate the particular user's research of the similar search results.

DETAILED DESCRIPTION

A project group comprising a group of users may be selected to perform collaborative research on one or more topics. For example, a group of consultants in a consulting firm may conduct marketing research, a group of university students may work together to write a research paper, a group of scientists may collaborate to research the findings of various studies, a group of analysts may perform an audit, a group of legal experts may engage in discovery, or any combination thereof. One or more of these groups of users may rely on one or more search engines, such as GOOGLE™, YTAHOO™, and/or BING™, to assist with the research.

When the group of users works together to conduct research, the group of users may be able to increase an efficiency of their efforts by communicating with each other, so that one user does not repeat the same search, or review the same search results, as another user of the group. When one user finds search results to be useful or informative, the user may want to share the search results with other users researching the same topic. In one example, the group of users may be assigned to one or more different research topics or subtopics. One user searching a first topic may locate search results that are relevant to a second, different topic. The user may want to share the search results with users assigned to the second topic.

Figure 1:
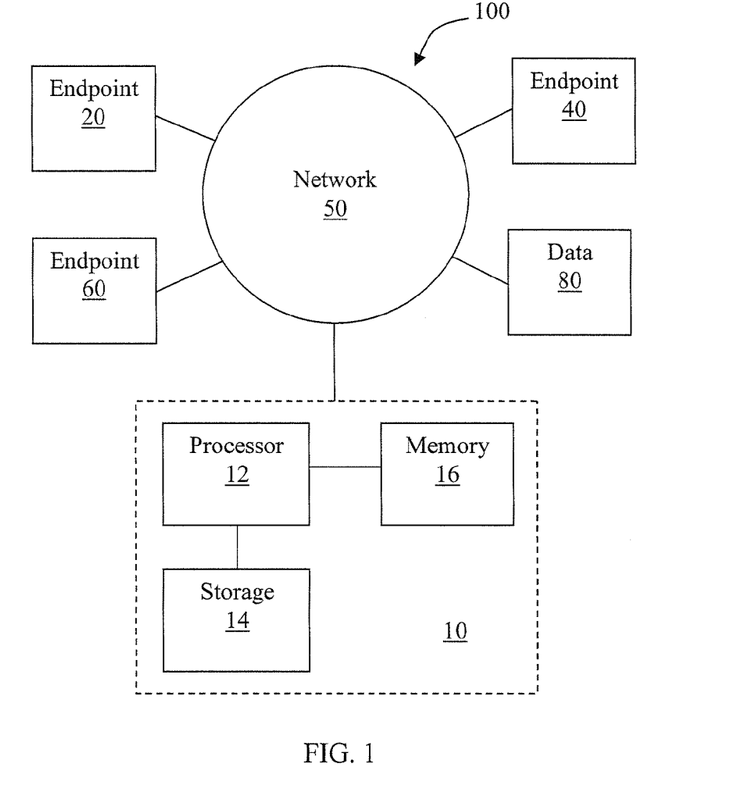
FIG. 1 depicts a block diagram of an example of a network associated with collaborative research.

FIG. 1 depicts a block diagram of an exemplary network 50 associated with collaborative research. A plurality of endpoint devices, including endpoint devices 20, 40, and 60 may be operatively coupled to network 50. Endpoint devices 20, 40, and/or 60 may be associated with one or more network users or subscribers.

Network 50 may comprise a public network or a private network established for personal use, business use, governmental use, or any combination thereof. For example, network 50 may comprise a cable network, a satellite network, a cellular network, a telephone network, a broadband network, a voice over Internet (VoIP) network, or any combination thereof. Furthermore, network 50 may comprise a wired network, a wireless network, a local area network, a wide area network, the Internet, a virtual network, or any combination thereof.

Network 50 may be operatively coupled to a collaborative research apparatus 10. Collaborative research apparatus 10 may be associated with a network user. In one example, collaborative research apparatus 10 may be operated by a service provider. Collaborative research apparatus 10 may comprise a server, a service provider, a search engine, a browser, a central processor, a mobile telephone, a smartphone, a tablet, a personal computer, a laptop, a personal digital assistant (PDA), or any combination thereof. Collaborative research apparatus 10 may be operatively coupled to an endpoint device, such as one or more of endpoint devices 20, 40, and/or 60, via network 50.

Apparatus 10 may comprise a processing device 12, one or more storage devices, such as a storage device 14, and a memory device 16. Storage device 14 may be configured to store information associated with an endpoint device, such as endpoint devices 20, 40, and/or 60. The stored information may comprise subscriber information, user identifications, group identifications, group associations, search terms, topics, search results, other information associated with collaborative searching, or any combination thereof.

Memory device 16 may be configured to store instructions associated with one or more processes, programs, and/or operations associated with collaborative searching. Processing device 12 may be configured to execute the stored instructions. Processing device 12 may access memory 16 and/or storage device 14 to run, store, and/or archive one or more programs. Memory 16 and/or storage device 14 may comprise RAM, ROM, or other types of storage or memory devices.

Endpoint devices 20, 40, and/or 60 may be configured to access a search engine using an application program or web browser, such as EXPLORER™ or FIREFOX™. The search engine may allow an endpoint device, such as endpoint devices 20, 40, and/or 60, to conduct a search for information on the World Wide Web. In one example, an endpoint device, such as endpoint devices 20, 40, and/or 60, may be configured to conduct a search of one or more databases 80 (hereafter referred to as databases 80) associated with network 50. For example, databases 80 may comprise intra-company data being searched as part of an audit or a discovery request. The search results may be presented to one or more endpoint devices, such as endpoint devices 20, 40, and/or 60, as a list of results including web pages, images, information, other types of files, or any combination thereof.

Processing device 12 may be configured to identify a first set of search results associated with a first user, and to identify a second set of search results associated with a second user. Processing device 12 further may be configured to compare the first set of search results with the second set of search results.

Processing device 12 may be configured to modify the second set of search results based, at least in part, on the above-described comparing, and to generate a modified version of the second set of search results that is displayed to the second user. The second set of search results may be modified based, at least in part, on a flag associated with at least one search result. The flag may indicate a user-rating of the at least one search result. In one example, the flag may indicate that the at least one search result comprises a relevant search result.

Processing device 12 may be configured to display the at least one search result to the second user together with the second set of search results, in response to determining that the at least one search result is relevant. The user-input may be associated with the first user, and processing device 12 may be configured to display an identification of the first user while displaying the at least one search result.

In one example, the flag may indicate that the at least one search result comprises a non-relevant search result. Processing device 12 may be configured to remove the at least one search result from the second set of search results, in response to deteHnining that the at least one search result is non-relevant. The at least one search result may comprise a common search result returned for both the first set of search results and the second set of search results.

Processing device 12 further may be configured to receive a search request, and receive a rating for at least one search result associated with the search request. The second set of search results may be modified based, at least in part, on the rating. In one example, the rating may indicate a relative level of correlation and/or relevance of the at least one search result with the search request. The first set of search results and the at least one search result may be displayed in response to receiving the search request, and the rating may be submitted by the first user.

Figure 2:
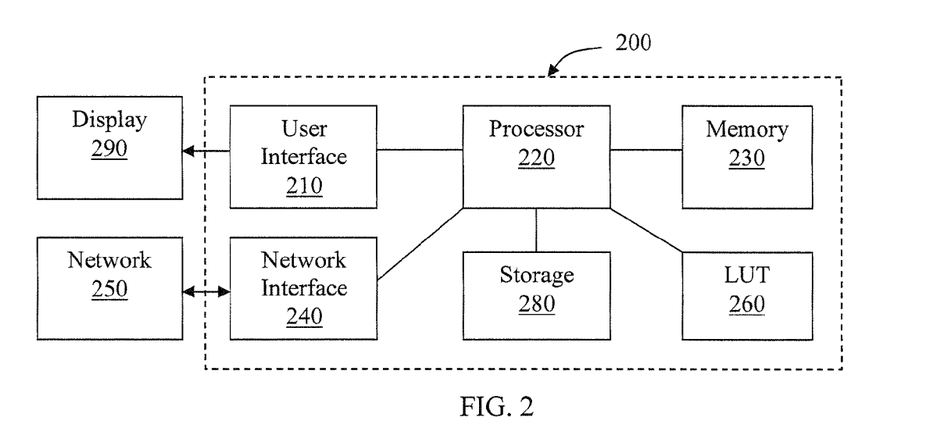
FIG. 2 depicts an example of an apparatus configured to provide collaborative research services.

FIG. 2 depicts an exemplary apparatus 200 configured to provide collaborative research services. Apparatus 200 may comprise a processing device 220 operatively coupled to a memory device 230, a storage 280 device, a network interface 240, and a user interface 210. Network interface 240 also may comprise electronic circuits or programs configured to interface and/or communicate with a network 250, such as a wired network, a wireless network, or any combination thereof. In one example, and substantially similar to network 50 as described with respect to FIG. 1, network 250 may operatively couple a plurality of devices, such as endpoint devices 20, 40, and/or 60.

Memory device 230 may be configured to store instructions associated with an application program. Storage device 280 may be configured to store resource identifiers, contact identifications, contact lists, subscriber presence status, greeting messages, incoming messages, or any combination thereof. A look-up table (LUT) 260 may be configured to maintain relational data for one or more types of data or fields stored in storage 280.

Processing device 220 may be configured to execute stored instructions. Processing device 220 also may be configured to access memory device 230, LUT 260, storage device 280, or any combination thereof, to run, store, and/or archive one or more programs. Memory device 230, LUT 260, and/or storage device 280 may comprise RAM, ROM, or other types of storage or memory devices.

Processing device 220 may be configured to manage and/or to control collaborative research associated with, or provided to, one or more endpoint devices, users, or subscribers. Processing device 220 further may be configured to receive input and/or commands from a user or subscriber via user interface 210.

User interface 210 may be operatively coupled to a display 290. Display 290 may comprise a computer, a television, a monitor, a smart-phone, a plasma screen, a LCD screen, a projection screen, or the like, or any combination thereof. User interface 210 and/or display 290 may be configured to display resource identifiers, contact identifications, contact lists, subscriber presence status, greeting messages, incoming messages, text messages, voice-to-text, or any combination thereof.

Apparatus 200 may be configured to identify a first set of search results associated with a first user, to identify a second set of search results associated with a second user, and to compare the first set of search results with the second set of search results. Apparatus 200 further may be configured to identify the second set of search results based, at least in part, on the above-described comparing. A modified version of the second set of search results may be displayed to the second user.

In one example, a search result associated with the first set of search results may be added to the second set of search results. The first user may be associated with a first search topic, and the second user may be associated with a second search topic. The search result may be identified by the first user as being associated with the second search topic.

Apparatus 200 may be configured to flag the search result as being associated with the second search topic. One or more users associated with the second search topic may be selected, and the modified version of the second set of search results may be displayed to the one or more users.

One or more users may register with a search group. For example, the first user may be associated with a first search group, and the second user may be associated with a second search group. Apparatus 200 may be configured to return the first set of search results and the second set of search results.

Apparatus 200 may be configured to identify common search results based, at least in part, on comparing the first set of search results with the second set of search results. Apparatus 200 further may be configured to filter the common search results and to identify the common search results that were displayed to the first user. The common search results may be indicated while the second set of search results is displayed to the second user.

For purposes of illustration, and without limitation, exemplary applications of collaborative research are described below with reference to FIGS. 3-5.

Figure 3:
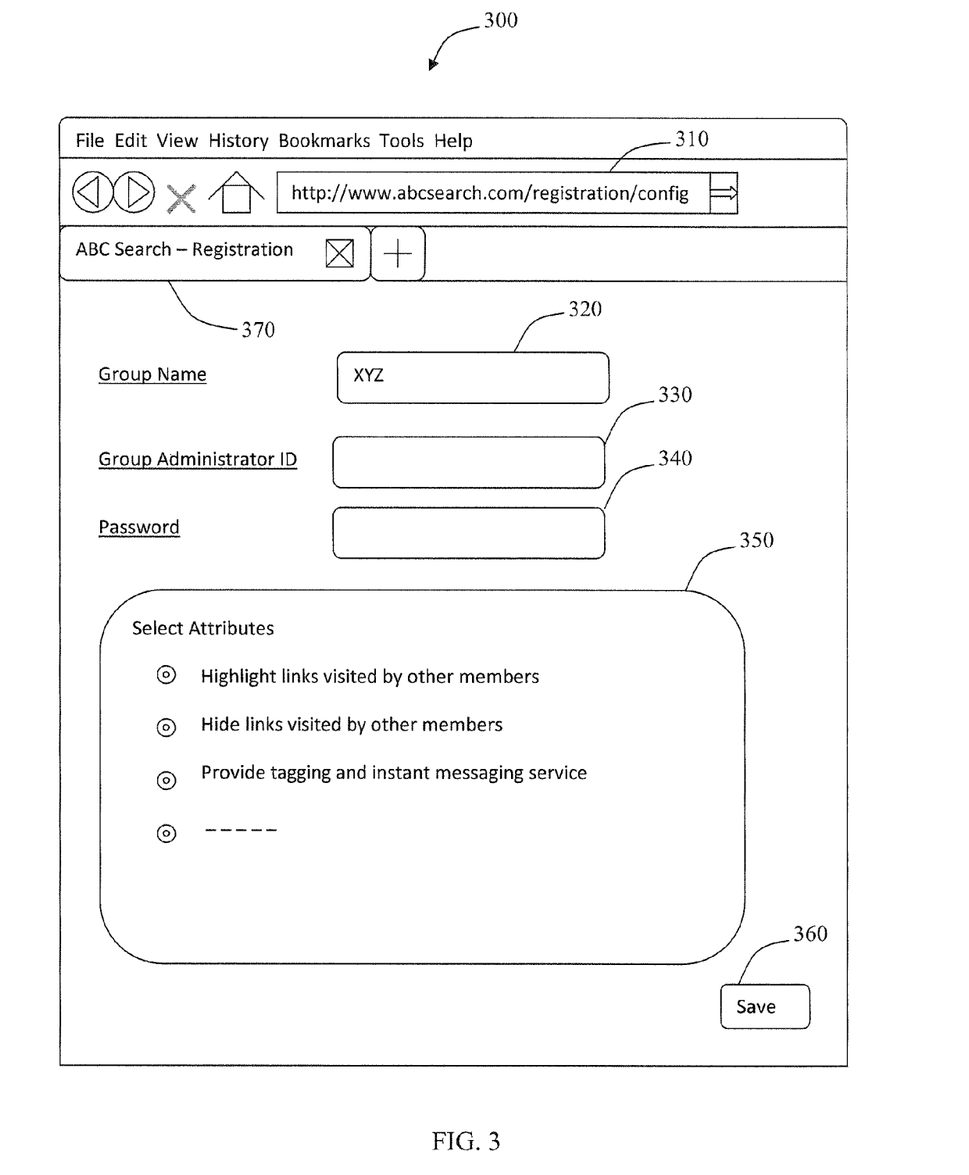
FIG. 3 depicts an example of a user interface configured to provide collaborative research services.

FIG. 3 depicts an example of a user interface 300 configured to provide collaborative research services. User interface 300 may be operatively coupled to, or may comprise, a display device, a computer, a television, a monitor, a smart-phone, a plasma screen, a LCD screen, a projection screen, an audio system, a telephone system, a voice activated system, a key entry system, a text entry system, or any combination thereof. User interface 300 may be associated with a server, a service provider, a search engine, a browser, a central processor, a mobile telephone, a smart-phone, a tablet, a personal computer, a laptop, a personal digital assistant (PDA), or any combination thereof.

A group of users may use an Internet search engine to obtain search results, such as, in one example, products and companies that produce surgical instruments. Users that independently conduct searches may visit the same web pages visited by other users of the group. The group of users may conduct research on two or more related topics. A first user may conduct research associated with a first search topic, such as image-guided surgical tools, and a second user may conduct research associated with a second research topic, such as robot-based surgical tools. The first user may find an interesting robot-based surgical tool and want to notify the second user.

One of the users may be designated as an administrator of the group. The group administrator may access user interface 300, which may comprise a registration page, by entering an address 310. The group administrator may enter a group name 320, an administrator ID 330, and/or a password 340. The group administrator further may select features from an attributes section 350 and enter identifications and/or email addresses of other users. A save button 360 may be selected by the group administrator to save the information associated with the group of users. A menu 370 may provide further user-selectable collaborative research options. A user may be associated with a plurality of groups.

Users may be identified and/or authenticated when the users log in to the search group. In one example, a user who has logged in to the search group may be identified by one or more user identifiers, such as a "cookie" that is saved onto the endpoint device associated with the user. Furthermore, the user identifiers may be used to track websites visited by the user and/or tag search results associated with the user. An email notification may be sent to the group of users to indicate the creation of the search group. The group of users may be requested to confirm their participation in the group.

Figure 4:
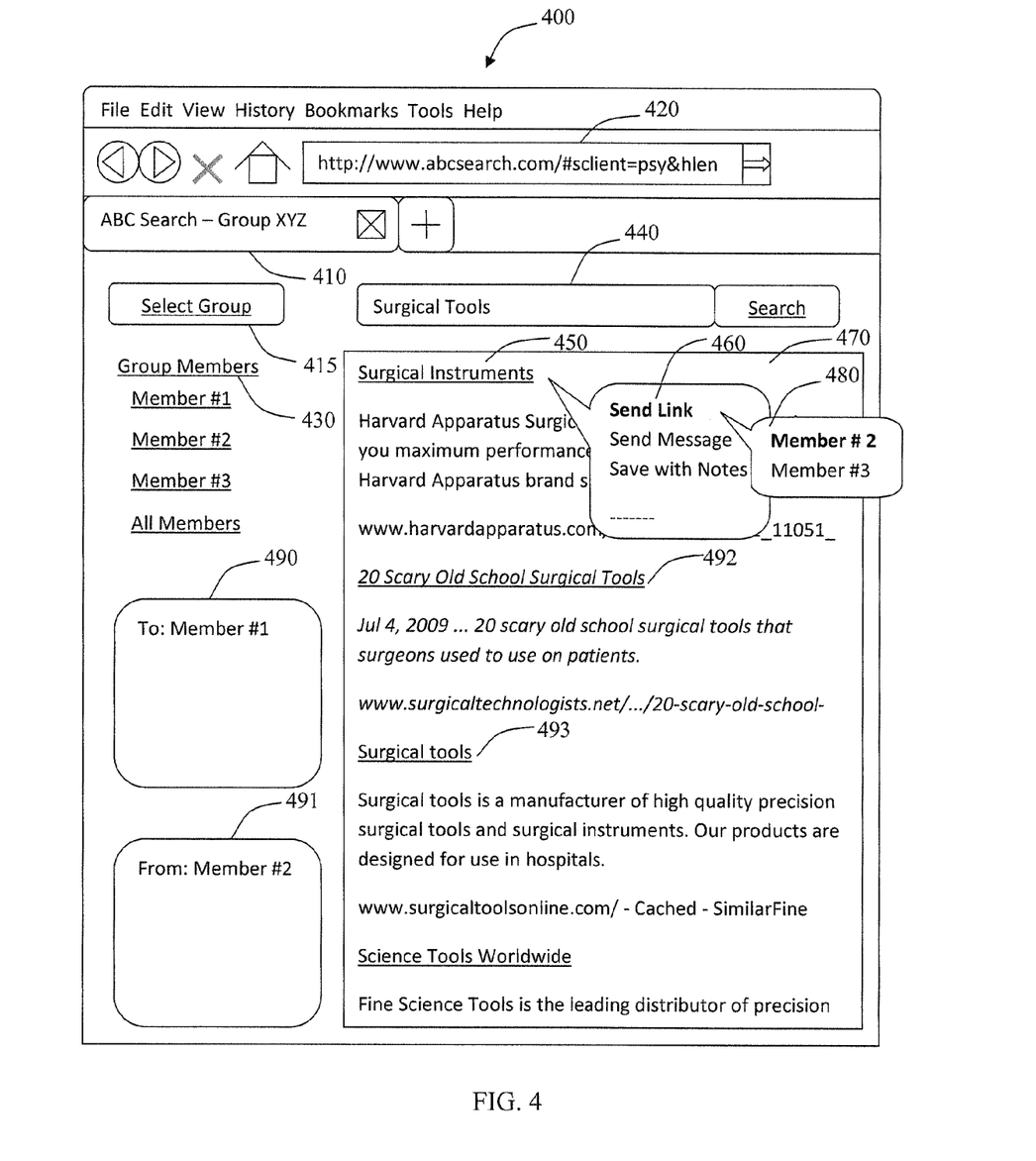
FIG. 4 depicts a further example of a user interface configured to provide collaborative research services.

FIG. 4 depicts a further example of a user interface 400 configured to provide collaborative research services. User interface 400 may operate substantially similar to user interface 300, depicted in FIG. 3, except as described herein. User interface 400 may be configured to display, indicate, and/or otherwise provide a group search page 410. Group search page 410 may be associated with a search engine.

A user may access user interface 400 by entering an address 420. Group search page 410 may be displayed in response to identifying that the user belongs to the associated search group. The group search page 410 may present a list of users 430, a "To" message box 490, and a "From" message box 491. Message box 490 and/or message box 491 may be associated with instant messaging or email applications, for example.

A first user, e.g., Member #1, may enter a search term, such as "surgical tools," in a search box 440. User interface 400 may present search results 470 in response to the entry of the search term. Search results 470 may comprise web pages with web links 450, 492, and/or 493. In response to the first user clicking one of the web pages and/or web links, user interface 400 may enter a new window with the linked page, and/or user interface 400 may present an options box 460 including user-selectable options, such as "Send Link", "Send Message", "Save with Notes", or the like.

User interface 400 may be configured to provide a selection box 480 from which to choose one or more users to send the link information. The first user may enter a message in message box 490 and send the message to one or more users together with a selected web page. The message in message box 490 may be sent to one or more users selected from and/or designated by list of users 430. The selected users may be associated with a search group. A select group option 415 may change the users indicated in list of users 430. The first user may receive a message in message box 491 from one or more other users associated with the same search group, or associated with a different search group, as the first user.

A web page that has already been visited by one of the users may be indicated by a distinct format, such as using a different color, a different font, e.g., bold or italics, and/or a different amount of transparency from the other web pages and/or web links that have been displayed in the search results. In one example, a previously viewed web page may be displayed together with user identification, such as a user's initials, associated with the user who first viewed the web page.

User interface 400 may be configured to assign different colors for each user, and to highlight the visited web pages with the associated assigned color. For example, a first web page visited by the first user may be assigned and/or displayed using a first color, and a second web page visited by a second user may be assigned and/or displayed using a second color. Identifying web pages that have already been visited by other users may reduce overlapping work among the group users. In one example, user interface 400 may be configured to hide search results already visited by other users. The option of hiding such web pages may be configurable in user interface 300, as depicted in FIG. 3.

Search results may be associated with a rating. For example, a search result that is identified as having a high degree of correlation with the search request may be color coded or shown with a different font from other search results. In one example, a search result that is initially identified during a first search as having a low degree of correlation with the search request may be hidden from view during subsequent searches. The rating may be user-generated and/or generated by a processing device.

Figure 5:
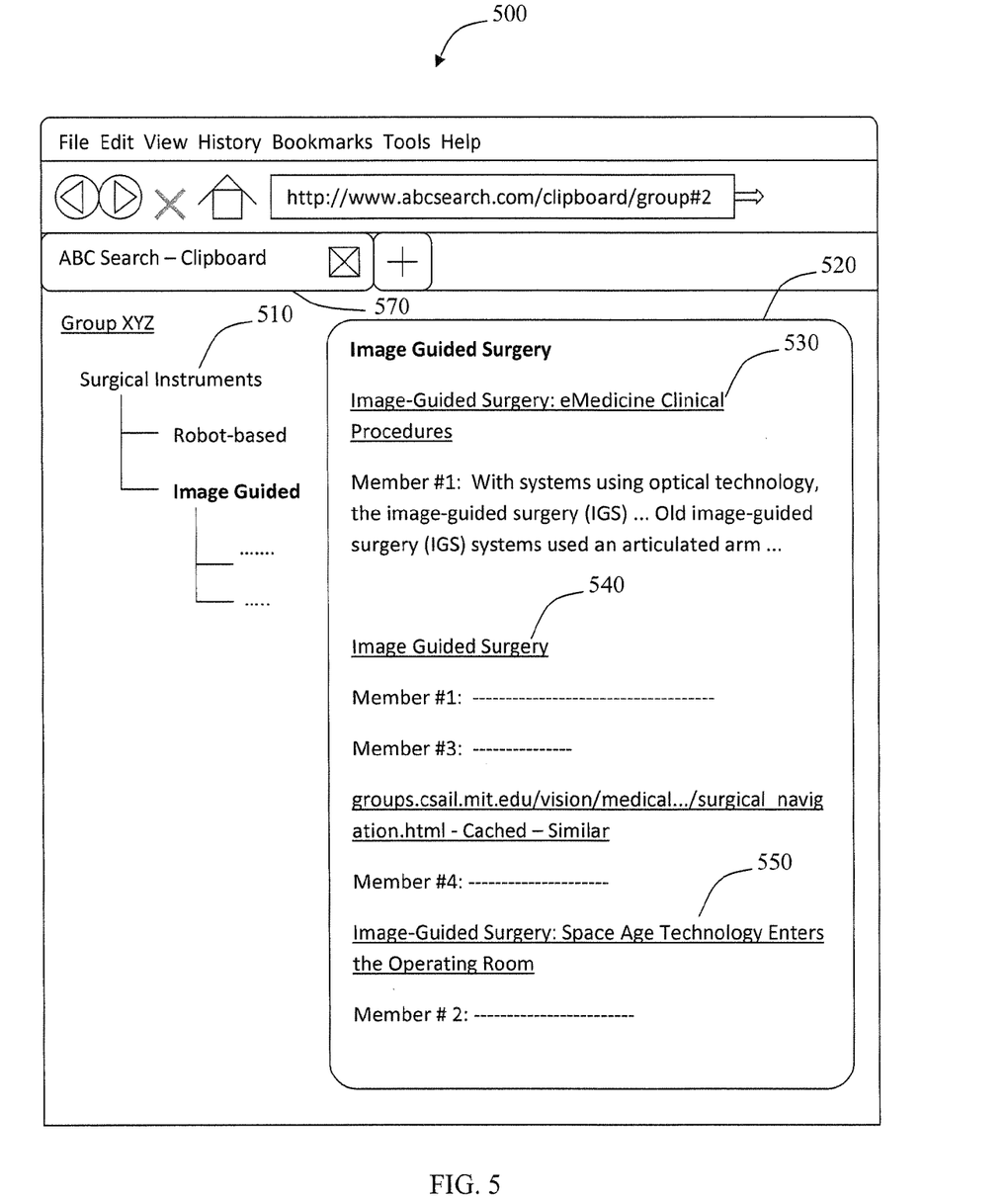
FIG. 5 depicts yet a further example of a user interface configured to provide collaborative research services.

FIG. 5 depicts yet a further example of a user interface 500 configured to provide collaborative research services. User interface 500 may operate substantially similar to user interface 300 and/or user interface 400, depicted in FIG. 3 and FIG. 4, respectively, except as described herein. User interface 500 may be configured to display, indicate, and/or otherwise provide a group clipboard 570. In one example, user interface 500 may be configured to allow one or more users to register with a search group and to manage research collaboration using one or more search engines.

Users may save search results with comments by using group clipboard 570. For example, group clipboard 570 may be displayed in response to the selection of an option, e.g., "Save with Notes", from options box 460 as depicted in FIG. 4. Group clipboard 570 may be organized by topics 510, and users may specify where to store the search results, such as web pages, and any associated notes. Topics 510 may provide information associated with a search hierarchy, a directory, a thread, a chronological history of search results, or any combination thereof. Topics 510 may be generated by the group administrator, by a collaborative effort of the group of users, or by a processing device. In one example, topics 510 may be automatically sorted by key words under an associated group name. Group clipboard 570 may be generated, modified, and/or updated in real-time based on one or more search results.

The stored search results may be uniquely identified by a user identification, illustrated as Member #1, Member #2, Member #3, and Member #4 in a search results window 520. A search result may be displayed with a note associated with a user, as illustrated by search result 530, or a search result may be displayed with a plurality of notes associated with multiple users, as illustrated by search result 540. Search results 530, 540, and/or 550 identified in a group clipboard may be viewed, edited, and/or saved by one or more of the users.

A first set of search results, such as search result 530, associated with a first user may be identified, and a second set of search results, such as a search result 550, may be associated with a second user. The first set of search results may be compared with the second set of search results, and the second set of search results may be modified based, at least in part, on the above-described comparing. A modified version of the second set of search results may be generated and displayed to the second user. In one example, the first set of search results may comprise at least one search result, and the at least one search result may be removed from the second set of search results.

Modifying the second set of search results may comprise adding at least one search result from the first set of search results to the second set of search results. At least one search result may be displayed to the second user together with comments provided by the first user. The comments may be identified as being associated with the first user.

Comments from the second user may be received after the modified version of the second set of search results is displayed, and the comments may be associated with at least one search result. The comments may be displayed to the first user together with the at least one search result. The comments may be identified as being associated with the second user. The second user may request that the comments be sent to the first user.

The first set of search results may be displayed to the first user in response to receiving a first search request associated with the first user. A second search request associated with the second user may be received, and the second set of search results may be displayed to the second user in response to receiving the second search request.

Figure 6:
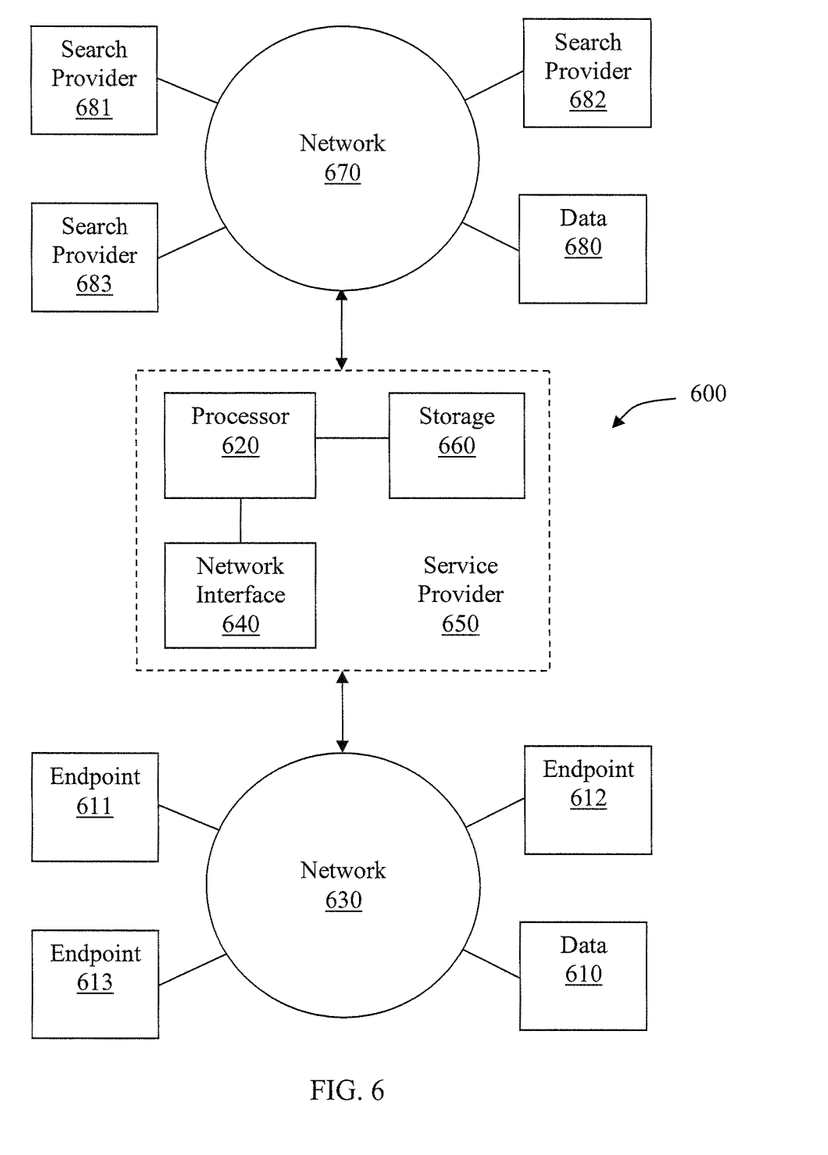
FIG. 6 depicts an example of a collaborative research system comprising a service provider.

FIG. 6 depicts an exemplary collaborative research system 600 comprising a service provider 650. Service provider 650 may comprise one or more network interfaces, such as a network interface 640, configured to interface with a first network 630. First network 630 may operatively couple one or more endpoints, such as endpoints 611, 612, and/or 613, with service provider 650. First network 630 may comprise a service provider's network, such as a cable network, a satellite network, a cellular network, a telephone network, a broadband network, other types of networks, or any combination thereof. Network interface 640 may comprise a router, a gateway, a modem, or any combination thereof, and may be configured to operatively couple service provider 650 to first network 630.

Service provider 650 may be configured to distribute data to an endpoint, such as endpoint 611. Service provider 650 may receive a data request from an endpoint, such as endpoint 611. The data request may include one or more search terms. Responsive to receiving the data request, service provider 650 may transmit information corresponding to the search request.

The information may be stored in one or more memory devices 660. Service provider 650 may be configured to associate a selected field with the stored information, and identify the information based on the association. Service provider 650 further may be configured to perform an Internet search for the information. Service provider 650 may comprise one or more processing devices, such as processing device 620, configured to process and/or perform one or more operations. Instructions for performing the operations may be stored in one or more memory devices 660. Processing device 620 may be configured to execute the instructions.

One or more network interfaces 640 may be configured to interface with a second network 670. Second network 670 may comprise a private network of databases or search engines and/or a public network, such as the Internet. In one example, service provider 650 may be configured to request the search from one or more search providers, such as search providers 681, 682, and/or 683, associated with second network 670. A search provider, such as search provider 681, may comprise a third party search engine designated and/or requested by an endpoint, such as endpoint 611.

Search provider 681 may be configured to search one or more databases, such as a database 680, associated with second network 670. Database 680 may comprise a database accessible via second network 670. For example, database 680 may be associated with a library, a hospital, a business, an association, a governmental agency, a records department, other types of entities, or any combination thereof.

In one example, service provider 650 may be configured to operate as a router, a gateway, or an interface between first network 630 and second network 670. An endpoint, such as endpoint 611 may request the search from a search provider, such as search provider 681, after service provider 650 routes the request. Furthermore, service provider 650 may be configured to provide search results based on a local database 610 associated with first network 630. For example, local database 610 may comprise a company database associated with endpoints 611, 612, and/or 613. Service provider 650 may be configured to perform an enterprise and/or intra-company search of one or more databases, such as local database 610.

Service provider 650 may be configured to provide services related to collaborative searching activities among a group of users. For example, service provider 650 may allow a group of users associated with endpoints 611, 612, and/or 613 to create a search group and/or register for one or more search related services. Service provider 650 may be configured to identify web pages or other search results that have already been viewed by one or more users, and/or to provide a group clipboard, such as group clipboard 570 depicted in FIG. 5, for the users to save search results and/or remarks. The group clipboard may be configured to automatically collect notes and/or associate remarks with the search results, such as web pages.

Figure 7:
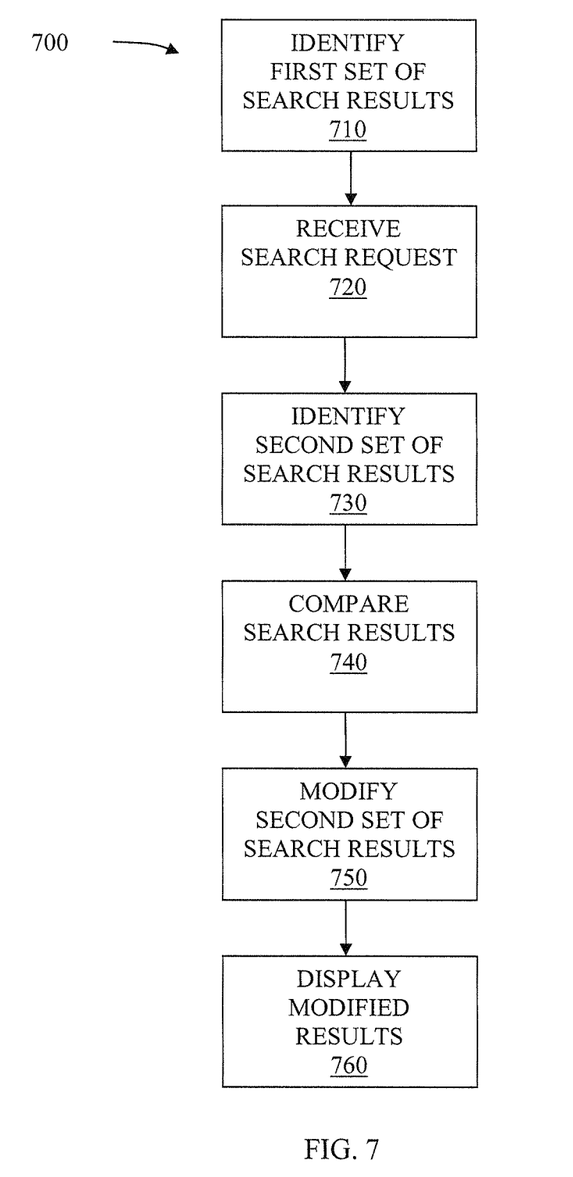
FIG. 7 depicts an example of a process for providing collaborative research.

FIG. 7 depicts an example of a process 700 configured to provide collaborative research. At operation 710, a first set of search results may be identified. The first set of search results may be associated with a first user.

At operation 720, a search request may be received. In one example, the first set of search results may be displayed in response to receiving a first search request associated with the first user, and the first set of search results may be displayed to the first user. The search request received at operation 720 may comprise a second search request.

At operation 730, a second set of search results may be identified based, at least in part, on the search request received at operation 720. The second set of search results may be associated with a second user.

At operation 740, the first set of search results may be compared with the second set of search results. Comparing the first set of search results with the second set of search results may comprise identifying common search results found in both of the first set of search results and the second set of search results.

At operation 750, the second set of search results may be modified based, at least in part, on the above-described comparing, to generate a modified version of the second set of search results. Modifying the second set of search results may comprise displaying the second set of search results and indicating the common search results. The first set of search results may be associated with the first user, and the second set of search results may be associated with the second user. In one example, the second set of search results may be displayed using a first font color, and the common search results may be indicated using a second font color. The first font color may identify the first user.

At operation 760, the modified version of the second set of search results may be displayed in response to receiving the search request. The modified version of the second set of search results may be displayed to the second user. In one example, the common search results may not be displayed when the modified version of the second set of search results are displayed. The common search results may be displayed to the first user with the first set of search results prior to displaying the modified version of the second set of search results to the second user.

The exemplary process 700 depicted by FIG. 7, and the associated operations described therein, may be performed by one or more processing devices, such as processing device 12, processing device 220, and/or processing device 620, as depicted by FIGS. 1, 2, and 6, respectively.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. We claim all modifications and variation coming within the spirit and scope of the following claims.

The invention claimed is:

1. A method, comprising:
identifying, by a collaboration processing device, a first set of search results for a search initiated by a first user with a first search request received by a user processing device different from the collaboration processing device;
receiving, by the collaboration processing device, a second search request initiated by a second user different from the first user;
identifying, by the collaboration processing device, a second set of search results based, at least in part, on the search request initiated by the second user;
comparing, by the collaboration processing device, the first set of search results with the second set of search results to identify a selected feature corresponding to at least one search result in the first or second sets of search results;
modifying, by the collaboration processing device, the second set of search results based, at least in part, on the selected feature identified in said comparing, to generate a modified version of the second set of search results comprising the at least one search result and the selected feature that is displayed to the second user in response to receiving the search request; and
distinguishing display of the first set of search results in the modified version of the second set of search results that have been previously accessed by the first user from the first set of search results in the modified version of the second set of search results that have not been previously accessed by the first user.

2. The method of claim 1 wherein the selected feature is configured to identify which of the first set of search results in the modified version of the second set of search results have been previously accessed by the first user.

3. The method of claim 2, further comprising:
displaying the first set of search results in a first color in the modified version of the second set of search results; and
displaying the second set of search results in a second color in the modified version of the second set of search results.

4. The method of claim 1, wherein the first set of search results are displayed in response to receiving a search request associated with the first user, and wherein the first set of search results is displayed to the first user.

5. The method of claim 1 wherein the selected feature is configured to identify which of the modified version of the second set of search results are from the first set of search results and which of the modified version of the second set of search results are from the second set of search results.

6. The method of claim 1, wherein said modifying comprises causing the common search results not to be displayed with the modified version of the second set of search results.

7. The method of claim 6, wherein the common search results are displayed with the first set of search results prior to displaying the modified version of the second set of search results.

8. The method of claim 1, further comprising displaying a group clipboard that includes the first set of search results and the second set of search results.

9. The method of claim 8, further comprising:
organizing, by the collaboration processing device, the first and second sets of search results according to different topics;
displaying the different topics in the group clipboard; and
displaying the first and second sets of search results in an order in the group clipboard according to the different topics.

10. A memory device having instructions stored thereon that, in response to execution by a collaboration processing device, cause the collaboration processing device to perform operations comprising:
identifying a first set of search results for a first search initiated with a first search request by a first user on a user processing device;
identifying a second set of search results for a second search initiated with a second search request by a second user, wherein the second user is different from the first user;
comparing the first set of search results with the second set of search results to identify a selected feature corresponding to at least one search result the first or second sets of search results;
modifying the second set of search results based, at least in part, on the selected feature identified in the comparing, to generate a modified version of the second set of search results comprising the at least one search result and the selected feature that is displayed to the second user; and
distinguishing display of the identified search results in the modified version of the second set of search results that have been previously accessed by the first user from the identified search results in the modified version of the second set of search results that have not been previously accessed by the first user.

11. The memory device of claim 10, wherein the operations further comprise identifying which of the modified version of the second set of search results have been previously accessed by the first user.

12. The memory device of claim 10, wherein the operations further comprise displaying comments provided by the first user in the modified version of the second set of search results displayed to the second user.

13. The memory device of claim 10, wherein the operations further comprise distinguishing in the modified version of the second set of search results the first set of search results from the second set of search results.

14. The memory device of claim 10, wherein the first set of search results comprises the at least one search result, and wherein the modifying comprises removing the at least one search result from the second set of search results.

15. The memory device of claim 10, wherein the operations further comprise:
receiving comments from the second user after the modified version of the second set of search results is displayed; and
associating the comments with the at least one search result associated with the modified version of the second set of search results.

16. The memory device of claim 15, further comprising causing the comments to be displayed to the first user together with the at least one search result.

17. The memory device of claim 16, wherein the comments are identified as being associated with the second user.

18. The memory device of claim 16, wherein the operations further comprise receiving a request from the second user to send the comments to the first user.

19. The memory device of claim 10, wherein the first set of search results are displayed to the first user in response to receiving a first search request associated with the first user, wherein the operations further comprise receiving a second search request associated with the second user, and wherein the second set of search results are displayed to the second user in response to receiving the second search request.

20. An apparatus, comprising:
a memory device configured to store instructions; and
a collaboration processing device that, in response to executing the instructions stored in the memory device, is configured to:
identify a first set of search results from a first search initiated by a first user with a first search request received on a user processing device;
identify a second set of search results from a second search initiated by a second user with a second search request, wherein the second user is different from the first user;
compare the first set of search results with the second set of search results to identify a selected feature corresponding to at least one search result in the first or second sets of search results; and
modify the second set of search results based, at least in part, on the selected feature identified in the comparing, to generate a modified version of the second set of search results comprising the at least one search result and the selected feature that is displayed to the second user;
identify common search results in the modified version of the second set of search results contained in both the first set of search results and the second set of search results; and
distinguish display of the identified search results in the modified version of the second set of search results that have been previously accessed by the first user from the identified search results in the modified version of the second set of search results that have not been previously accessed by the first user.

21. The apparatus of claim 20, wherein the modifying comprises modifying the second set of search results based, at least in part, on a flag associated with the at least one search result from the first set of search results.

22. The apparatus of claim 21, wherein the flag indicates that the at least one search result comprises a relevant search result, and wherein the collaboration processing device is configured to provide for display the at least one search result to the second user together with the second set of search results, in response to determining that the at least one search result is relevant.

23. The apparatus of claim 22, wherein the collaboration processing device is further configured to provide for display an identification of the first user in displaying the at least one search result.

24. The apparatus of claim 21, wherein the flag indicates that the at least one search result comprises a non-relevant search result, and wherein the collaboration processing device is configured to remove the at least one search result from the second set of search results in response to identifying the flag.

25. The apparatus of claim 20, wherein the collaboration processing device is further configured to identify which of the modified version of the second set of search results were previously accessed by the first user.

26. The apparatus of claim 20, wherein the collaboration processing device is further configured to distinguish between the first set of search results and the second set of search results in the modified version of the second set of search results.

27. The apparatus of claim 20, wherein the collaboration processing device is further configured to:
 receive a search request; and
 receive a rating for the at least one search result associated with the search request, wherein the second set of search results is modified based, at least in part, on the rating.

28. The apparatus of claim 27, wherein the rating indicates a relative level of correlation of the at least one search result with the search request.

29. The apparatus of claim 28, wherein the first set of search results and the at least one search result are displayed in response to receiving the search request, and wherein the rating is submitted by the first user.

30. An apparatus, comprising:
 means for identifying a first set of search results from a first search request initiated by a first user with a first search request receiving by a first processing device;
 means for identifying a second set of search results from a second search request initiated by a second user on a second processing device, wherein the first user is different from the second user;
 means for comparing the first set of search results with the second set of search results to identify a selected feature corresponding to at least one search result in the first or second sets of search results;
 means for modifying the second set of search results based, at least in part, on the selected feature identified in the comparing, wherein a modified version of the second set of search results comprises the at least one search result and the selected feature that is displayed to the second user; and
 means for distinguishing display of the first set of search results in the modified version of the second set of search results that have been previously accessed by the first user from the first set of search results in the modified version of the second set of search results that have not been previously accessed by the first user.

31. The apparatus of claim 30, wherein the means for modifying comprises means for adding the at least one search results to the modified version of the second set of search results based on an input from the first user.

32. The apparatus of claim 31, wherein the first search request is associated with a first search topic, wherein the second search request is associated with a second search topic, and wherein the at least one of the first set of search results is identified by the first user as being associated with the second search topic.

33. The apparatus of claim 32, further comprising means for selecting one or more users associated with the second search topic, and wherein the modified version of the second set of search results is displayed to the one or more users.

34. The apparatus of claim 30, further comprising means for identifying which of the first set of search results in the modified version of the second set of search results have been previously accessed by the first user.

35. The apparatus of claim 30, further comprising at least one search engine configured to return the first set of search results and the second set of search results.

36. The apparatus of claim 30, further comprising means for distinguishing in the modified version of the second set of search results between the first set of search results and the second set of search results.

37. The apparatus of claim 30, further comprising means for registering search groups, wherein the first user is associated with a first one of the search groups, and wherein the second user is associated with a second one of the search groups.

38. The apparatus of claim 30, further comprising means for filtering the common search results.

39. The apparatus of claim 38, wherein the means for filtering comprises means for identifying the common search results that were displayed to the first user, and wherein the means for modifying comprises means for indicating the common search results while displaying the second set of search results to the second user.

* * * * *